United States Patent
Niu et al.

(10) Patent No.: US 12,412,124 B2
(45) Date of Patent: Sep. 9, 2025

(54) DETECTING CATEGORY-SPECIFIC BIAS USING OVERFITTED MACHINE LEARNING MODELS

(71) Applicant: Capital One Services, LLC, McLean, VA (US)

(72) Inventors: Tong Niu, Plano, TX (US); John Lujano, Dallas, TX (US); Ruoyu Shao, Allen, TX (US); Abhishek Kumar Shrivastava, McKinney, TX (US); Christopher Cowden, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 862 days.

(21) Appl. No.: 17/539,828

(22) Filed: Dec. 1, 2021

(65) Prior Publication Data

US 2023/0169393 A1    Jun. 1, 2023

(51) Int. Cl.
*G06N 20/00*    (2019.01)
(52) U.S. Cl.
CPC ................... *G06N 20/00* (2019.01)
(58) Field of Classification Search
CPC .................................................. G06N 20/00
USPC ......................................................... 706/12
See application file for complete search history.

(56) References Cited

U.S. PATENT DOCUMENTS

| | | | |
|---|---|---|---|
| 2008/0071721 A1* | 3/2008 | Wang | G06N 20/00 706/48 |
| 2016/0042292 A1* | 2/2016 | Caplan | G06N 20/20 706/12 |
| 2019/0034830 A1* | 1/2019 | Burangulov | G06F 16/953 |
| 2019/0095756 A1* | 3/2019 | Agrawal | G06N 3/08 |
| 2020/0082300 A1* | 3/2020 | Farrar | G06N 20/00 |
| 2020/0202257 A1* | 6/2020 | Lee | G06V 10/82 |
| 2020/0210882 A1* | 7/2020 | Roberts | G06N 5/04 |
| 2020/0302234 A1* | 9/2020 | Walters | G06F 16/9035 |
| 2021/0150407 A1* | 5/2021 | Xu | G06N 5/02 |
| 2021/0201193 A1* | 7/2021 | Walters | G06F 16/285 |
| 2021/0241033 A1* | 8/2021 | Yang | G06F 18/217 |
| 2021/0287119 A1* | 9/2021 | Rink | G06Q 30/0201 |
| 2021/0303695 A1* | 9/2021 | Grosse | G06N 3/08 |
| 2021/0319333 A1* | 10/2021 | Lee | G06N 3/08 |
| 2023/0021674 A1* | 1/2023 | Matsuo | G06N 20/20 |

* cited by examiner

*Primary Examiner* — Hwei-Min Lu
(74) *Attorney, Agent, or Firm* — Foley & Lardner LLP

(57) ABSTRACT

Methods and systems are described herein for a mechanism for detecting model bias using a test model to compare predictions for specific categories of data. Thus, the system may detect category-specific model bias and/or present alternative predictions, for example, via overfitted and alternative machine learning models. Another mechanism for detecting model bias is to use residual data from predictions obtained from a machine learning model as the machine learning model processes different datasets (e.g., a training dataset and a compare dataset).

20 Claims, 10 Drawing Sheets

| User Identifier | Credit Score | Loan Amount | Net Worth | Outcome |
|---|---|---|---|---|
| abcd123xyz | 720 | 500,000 | 128,000 | True |
| abcd123esd | 806 | 750,000 | 350,000 | True |
| abcd123was | 650 | 425,000 | 55,000 | False |
| abcd123cvb | 620 | 400,000 | 55,000 | False |
| abcd123uop | 550 | 250,000 | 20,000 | False |

FIG. 2

| User Identifier | Credit Score | Loan Amount | Net Worth | Outcome |
|---|---|---|---|---|
| abcd123hjk | 605 | 480,000 | 128,000 | True |
| abcd123sdf | 610 | 445,000 | 155,000 | True |
| abcd123nbm | 650 | 425,000 | 145,000 | False |
| abcd123mkl | 620 | 400,000 | 135,000 | False |
| abcd123xdr | 680 | 425,000 | 180,000 | False |

FIG. 3

| User Identifier | Credit Score | Loan Amount | Net Worth | Outcome |
|---|---|---|---|---|
| abcd123wer | 710 | 480,000 | 128,000 | True |
| abcd123ert | 610 | 445,000 | 155,000 | True |
| abcd123rty | 800 | 425,000 | 145,000 | False |
| abcd123tyu | 550 | 400,000 | 135,000 | False |
| abcd123yui | 620 | 425,000 | 180,000 | False |

FIG. 5

| Group Identifier | Definition |
| --- | --- |
| Group 1 | ParamA:range 601-700 |
| Group 2 | ParamB:range 400,001-500,000 |
| Group 3 | ParamA:range 601-700<br>ParamB:range 400,001-500,000 |
| Group 4 | ParamA:range 701-800 |
| Group 5 | ParamC:range 100,000-200,000 |

FIG. 6

DETECTING CATEGORY-SPECIFIC BIAS USING OVERFITTED MACHINE LEARNING MODELS

BACKGROUND

Recently, use of machine learning technologies has been growing exponentially. Machine learning models are now used in many technology areas including computer vision, network monitoring, autonomous driving, and others. Generally, machine learning models are trained using, for example, a training dataset and then used to make predictions based on that training. Some machine learning models may continue to be trained while in production and may be re-trained in certain circumstances. However, it is difficult to determine when a machine learning model should be re-trained or otherwise updated.

SUMMARY

In many instances, machine learning models may be re-trained or otherwise updated when their performance degrades. For example, if performance of a machine learning model degrades by a certain percentage, a determination may be made to re-train that model. However, re-training a model is a very complex task that requires a training dataset. It may also be problematic to use the old training dataset as the performance of the model may degrade again or may be degraded as soon as re-training is complete. Furthermore, the model may generate better predictions for some data inputs than for other data inputs (e.g., the model may develop a bias for certain type of data over time). Thus, re-training the full model may degrade model performance. Therefore, methods and systems are described herein for detecting model bias and providing mechanisms of addressing model bias. A model monitoring system may be used to apply these mechanisms.

One mechanism for detecting model bias is to use a test model to compare predictions for specific categories of data. Thus, the model monitoring system may detect category-specific model bias and/or present alternative predictions, for example, via overfitted and alternative machine learning models. In some embodiments, the model monitoring system may adjust execution parameters and/or add an execution layer to the model for processing data corresponding to the particular category. The model monitoring system may obtain a first dataset to train a first machine learning model for testing a second machine learning model. The first machine learning model may be an overfitted machine learning model, trained using the first dataset, to test the second machine learning model, which may be an in-production machine learning model. The first dataset may be a dataset that was previously used to train the second machine learning model (e.g., a production machine learning model). In some embodiments, the first dataset may be a different dataset from the dataset that was used to train the second machine learning model (e.g., a historical dataset that includes observations).

The model monitoring system may then input a second dataset into the first machine learning model to obtain a first set of predictions. Thus, the first set of predictions is outputted by the first machine learning model based on the first machine learning model's processing of the first dataset. For example, the model monitoring system may input a compare dataset (e.g., of a new dataset) into the overfitted model to obtain prediction results.

The model monitoring system may receive a second set of predictions. The second set of predictions may have been outputted by the second machine learning model based on the second machine learning model processing the second dataset. For example, a system hosting the second machine learning model may receive the second dataset and input that second dataset in into the second machine learning model to obtain the second set of predictions. The system hosting the second machine learning model my then transmit the second set of predictions out to the user.

The model monitoring system may split, based on one or more features, the second dataset into multiple groups of entries. Each group may be associated with a corresponding category. In some embodiments, a category of data may be a range of values for one or more features. For example, a feature may correspond to an age of a person associated with each entry in the data. Thus, the model monitoring system may divide the entries into several age ranges (e.g., 18-25, 25-40, 40-55, etc.). Thus, entries corresponding to each age range may be entries within a particular category.

In some embodiments, the model monitoring system may use data structures or bins to perform the split of entries. For example, the model monitoring system may generate a plurality of data structures for the second dataset based on a parameter within the second dataset. Each data structure of the plurality of data structures may be associated with a different range of parameter values for the parameter. For example, the parameter may be a feature of the dataset (e.g., a person's age as exemplified above). The parameter may include a plurality of parameter values which may be divided into bins based on the parameter values (e.g., a bin for each age range of 18-25, 25-40, 40-55, etc.).

The model monitoring system may then divide the entries of the second dataset into the plurality of data structures according to a corresponding parameter value for the parameter for each entry in the second dataset. To continue with the example above, the entries may be divided by age ranges into bins with corresponding age range numbers. The model monitoring system may then select a bin to process. For example, the model monitoring system may select a bin corresponding to the age range of 18-25. In some embodiments, the model monitoring system may use a decision tree to determine the criterion for each bin. For example, based on the decision tree, the bins may be 16-20, 20-25, 25-30, etc.) instead of the above-described bins. In some embodiments, the model monitoring system may use a minimum bin parameter to ensure that at least a certain number of bins get created.

The model monitoring system may store a group definition for each group (e.g., a bin definition for each bin) and assign matching entries to the corresponding group. For example, the model monitoring system may select entries matching a category of data (e.g., a bin) corresponding to an age group of 18-25 and input those entries into the in-production machine learning model to obtain a set of predictions for those entries.

The model monitoring system may determine that a prediction difference between a first subset of the first set of predictions and a second subset of the second set of predictions satisfies a difference threshold. The first subset and the second subset may both corresponds to a first group of the plurality of groups. For example, the model monitoring system may select a group (e.g., a bin) corresponding to an age range of 18-25 and determine a prediction difference for that group. . . . In some embodiments, the model monitoring system may calculate an average difference for all the predictions (e.g., for each group) and determine whether that average difference meets a threshold value. In some embodiments, the model monitoring system may use prediction scores to determine whether a threshold is met. In response to determining that the prediction difference satisfies the threshold, the model monitoring system may generate an alert related to the category associated with the first group. The alert may be a notification to a user indicating the difference in predictions for a particular set of entries (e.g., for a particular bin).

In some embodiments, the model monitoring system may adjust parameters of the second machine learning model based on the prediction differences. For example, if the prediction difference for a group representing persons of ages between 18 and 25 is larger than the threshold, the model parameters may be adjusted for that group. In some embodiments, the adjustment may be to add another layer to the machine learning model when data matching the group (e.g., the particular bin) is received by the second machine learning model for processing.

In some embodiments, the model monitoring system may build an alternative machine learning model for the particular category of data (e.g., entries of a particular bin). That is, in response to determining that an average difference between the first and second sets of predictions satisfies a difference threshold, the model monitoring system may obtain and use an updated training dataset to train an alternative machine learning model associated with the category to which the first set of entries corresponds. For example, the model monitoring system may build an alternative machine learning model for entries where an age value is 18-25 (i.e., a particular bin of ages 18-25).

In some embodiments, when the model monitoring system determines that the in-production machine learning model has received input data that matches the category (e.g., matching the bin) that has an associated alternative machine learning model, the model monitoring system may run the input data through the alternative model and present both predictions to the user. That is, in response to the in-production machine learning model generating a prediction from production data input matching the category, the model monitoring system may input the production data input into the alternative machine learning model and present an alternative prediction outputted by the alternative machine learning model in connection with presentation of the prediction of the in-production machine learning model. In some embodiments, when the in-production machine learning model receives input data that matches the category (e.g., a particular bin), the in-production machine learning model may execute the parameter adjustments and/or use an additional layer as discussed above.

Another mechanism for detecting model bias is to use residual data from predictions obtained from the machine learning model. The model monitoring system may generate a plurality of groups based on a parameter within a first dataset. The first dataset may be a training dataset used to train a machine learning model. Each group of the plurality of groups may be associated with a different range of parameter values for the parameter. For example, the parameter may be a feature within the dataset. The feature may be, for example, a person's height or weight, or another suitable feature. Each group may represent a bin for a particular set of parameter values. For example, if the feature is a height of a person, the model monitoring system may generate bins for heights 0-3 feet, 3-4 feet, 4-5 feet, 5-5.2 feet, 5.2-5.5 feet, etc. In some embodiments, the model monitoring system may generate the groups (e.g., bins) based on a decision tree algorithm discussed in this disclosure.

In some embodiments, the model monitoring system may generate the groups based on the parameters (e.g., features) in the second dataset (e.g., the compare dataset). For example, the model monitoring system may detect the features of the second (e.g., the compare) dataset and select one of the features. The model monitoring system may generate group definitions based on the parameter values for the parameter. The model monitoring system may then assign a subset of parameter values to each particular group definition. Thus, each group will be associated with a particular group definition and a corresponding subset of parameter values (e.g., a range of values).

When the groups (e.g., bins) are generated, the model monitoring system may select a first group of the plurality of groups for processing. In some embodiments, the model monitoring system may iterate through each created group. For example, the model monitoring system may select a group (e.g., a bin) that represents heights of 0-3 feet. The model monitoring system may then obtain a first set of entries from the first dataset and a second set of entries from a second dataset such that the first set of entries and the second set of entries match the first group. In some embodiments, the second dataset may be a compare dataset that includes data collected during a different time period (e.g., at a later time period) after the data of the first dataset was collected. Thus, the changes between the first dataset and the second dataset for these selected entries may indicate a population shift between the datasets. To continue with the example above, if the group (e.g., the bin) with heights of 0-3 feet is selected, the model monitoring system may search both the first dataset (e.g., the training dataset) and the second dataset (e.g., the compare dataset) and extract, from each of the datasets, entries where the parameter (e.g., the feature) value representing a height of a person is 0-3 feet.

The model monitoring system may input the first set of entries into a machine learning model to obtain a first set of error values. The first set of error values is outputted by the machine learning model based on the machine learning model's processing of the first set of entries. For example, the model monitoring system may input the first dataset's (e.g., training dataset's) entries of the selected bin (e.g., entries with feature values of 0-3 feet for a height of a person) into the machine learning model and may obtain one or more predictions for each entry. In addition, the machine learning model may output error values (e.g., residual values) for each entry as that entry is processed by the machine learning model.

The model monitoring system may input the second set of entries into the machine learning model to obtain a second set of error values, the second set of error values outputted by the machine learning model based on the machine learning model's processing of the second set of entries. For example, the model monitoring system may input the second dataset's (e.g., compare dataset's) entries of the selected bin (e.g., entries with feature values of 0-3 feet for a height of a person) into the machine learning model and may obtain one or more predictions for each entry. In addition, the machine learning model may output error values (e.g., residual values) for each entry as that entry is processed by the machine learning model.

In response to determining that a difference between the first set of error values and the second set of error values satisfies an error threshold, the model monitoring system may transmit a notification to a user indicating the first group. The model monitoring system may compare the error values (e.g., the residuals) output by the machine learning model for the first set (e.g., the training dataset) and the second set (e.g., the compare dataset) and determine a difference (e.g., a pair-wise difference) for the error values (e.g., residual values). If the difference is larger than a threshold, the model monitoring system may notify a user of the residual. For example, the model monitoring system may notify a user when the residuals are higher in the compare dataset by a particular threshold amount.

In some embodiments, the model monitoring system may train an alternative machine learning model when, for example, the error values (e.g., the residuals) are higher in the compare dataset as compared with the training dataset by a particular threshold amount. That is, the model monitoring system may in response to determining that an average difference between the first and second sets of residual values for a first bin of the plurality of bins satisfies a residual threshold, use an updated training dataset to train an alternative machine learning model associated with the first bin. For example, the alternative machine learning model may be trained based on the data associated with the selected bin. The data may be from the training dataset, the compare dataset, and/or from both datasets. In some embodiments, the data may come from another dataset. In some embodiments, instead of or in addition to generating an alternative machine learning model, the model monitoring system may adjust execution of the machine learning model for the particular group (e.g., bin) and/or generate an additional layer for any data matching the group that is received for processing by the machine learning model.

In some embodiments, when data is inputted into a machine learning model that matches data associated with a group (e.g., a bin) that has a corresponding alternative machine learning model, the model monitoring system may input that data into the alternative machine learning model and output a prediction based on that data to the user. In some embodiments, the prediction may be outputted in combination with the prediction generated by the original machine learning model. Thus, in response to the machine learning model generating a prediction from production data input matching the first bin, the model monitoring system may input the production data input into the alternative machine learning model and present an alternative prediction outputted by the alternative machine learning model in connection with presentation of the prediction of the machine learning model.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data), unless the context clearly dictates otherwise.

BRIEF DESCRIPTION OF THE DRAWINGS

FIG. 2 illustrates an excerpt from an exemplary second dataset, in accordance with one or more embodiments of this disclosure.

FIG. 3 illustrates an excerpt of a data structure (e.g., a bin) for a subset of parameter values, in accordance with one or more embodiments.

FIG. 5 illustrates a table representing a group/bin, in accordance with one or more embodiments.

FIG. 6 illustrates a data structure that includes group identifiers (bin identifiers) and associated group definitions (bin definitions), in accordance with one or more embodiments.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
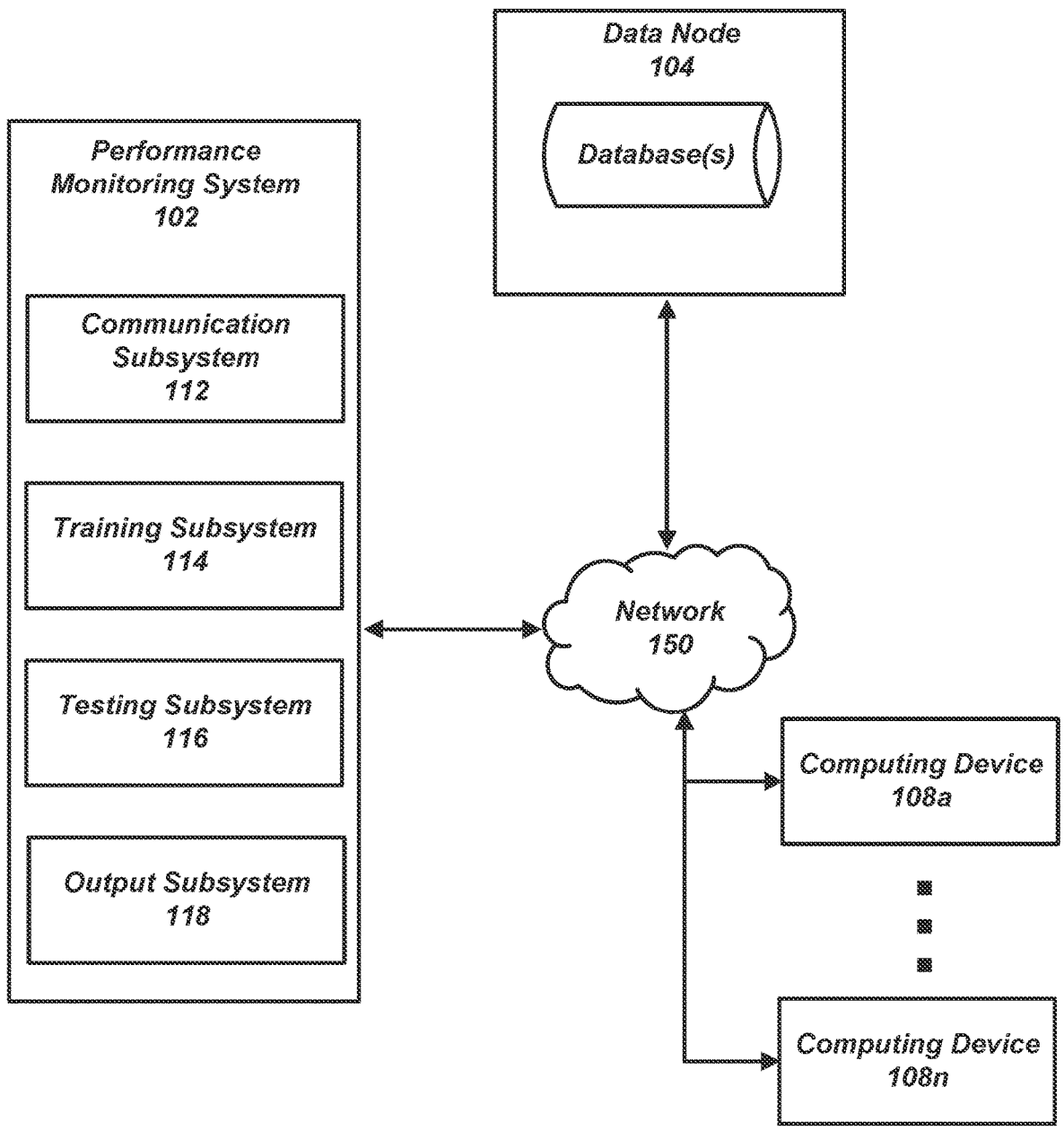
FIG. 1 a system for detecting category-specific model bias, in accordance with one or more embodiments of this disclosure.

FIG. 1 shows environment 100, which includes a system for detecting category-specific model bias. Environment 100 includes performance monitoring system 102, data node 104, and computing devices 108a-108n. Performance monitoring system 102 may execute instructions for detecting category-specific model bias, and may include software, hardware or a combination of the two. For example, performance monitoring system 102 may be a physical server or a virtual server that is running on a physical computer system.

Data node 104 may store various data, including various datasets and other data required for the performance monitoring system. In some embodiments, data node 104 may store one or more machine learning models and/or decisions trees. In some embodiments, data node 104 may also be used to train the machine learning models and decision trees. Data node 104 may include software, hardware, or a combination of the two. For example, data node 104 may be a physical server, or a virtual server that is running on a physical computer system. Network 150 may be a local area network, a wide area network (e.g., the Internet), or a combination of the two. Computing devices 108a-108n may be end-user computing devices (e.g., desktop computers, laptops, electronic tablets and/or other computing devices used by end users).

Performance monitoring system 102 may include communication subsystem 112. Communication subsystem 112 may include software components, hardware components, or a combination of both. For example, communication subsystem 112 may include a network card (e.g., a wireless network card and/or a wired network card) that is coupled with software to drive the card. Performance monitoring system 102 may also include training subsystem 114. Training subsystem 114 may include software components, hardware components, or a combination of both. Training subsystem 114 may perform various training functions for machine learning models.

In addition, performance monitoring system 102 may also include testing subsystem 116. Testing subsystem 116 may include software components, hardware components, or a combination of both. Testing subsystem 116 may perform various functions for testing machine learning model performance and detecting category-specific bias. Performance monitoring system 102 may also include output subsystem 118. Output subsystem 118 may include software components, hardware components, or a combination of both. For example, output subsystem 118 may include or may use video components (e.g., a video card) of a computer system and/or other components to provide output of the performance monitoring mechanism.

Detecting Category-Specific Bias Using Overfitted Machine Learning Models

One mechanism for detecting model bias is to use a test model (e.g., an overfitted model) to compare predictions for specific categories of data. Thus, performance monitoring system 102 may detect category-specific model bias and/or present alternative predictions, for example, via an overfitted machine learning model and/or alternative machine learning model. Performance monitoring system 102 may obtain a first dataset to train a first machine learning model for testing a second machine learning model. The first dataset may be the dataset that was previously used to train the second machine learning model. However, the dataset may be another dataset (e.g., another historical dataset). For example, performance monitoring system 102 may use communication subsystem 112 to request the first dataset from data node 104. Communication subsystem 112 may receive the first dataset from data node 104 in response to the request. In some embodiments, the request may include an identifier associated with the second machine learning model so that the correct training dataset may be retrieved by data node 104 and transmitted back to performance monitoring system 102.

In some embodiments, the first dataset may be a training dataset that may be used to train an overfitted machine learning model for testing an in-production machine learning model. The training dataset may have been previously used to train the in-production machine learning model. As referred to herein, the term "in-production" may refer to a machine learning model that is actively utilized to obtain predictions on incoming data. Thus, communication subsystem 112 may pass the training dataset to training subsystem 114. Training subsystem 114 may then train the overfitted model using the first (e.g., training) dataset. The training may be performed on performance monitoring system 102, on data node 104, or on another suitable system. Thus, after the training is completed, the overfitted machine learning model is configured to generate predictions overfitted to the training dataset. As discussed above, the first dataset/training dataset does not have to be a dataset that was used to train the in-production machine learning model. The first dataset/training dataset may be a historical dataset. The first dataset/training dataset may include actual observations for a target variable that may be used by the training algorithm when training the overfitted/first machine learning model.

Overfitting occurs during training of a machine learning model. For example, overfitting may occur when too many parameters are used to train the model. The machine learning model learns, in addition to the details of the training dataset, noise of the training dataset (e.g., noise in the unnecessary parameters). The learned noise may negatively impact the performance of the machine learning model as the model is used in a production environment. That is, the concepts associated with the noise are learned during training and are used to perform predictions. However, those concepts do not apply to incoming data for generating predictions and they negatively impact the ability of the model to generalize concepts.

When the training of the first machine learning model is completed, the first machine learning model may be stored on performance monitoring system 102 or on data node 104. The identification of the location of the model and instructions on how to access the model may be passed from training subsystem 114 to testing subsystem 116. Testing subsystem 116 may input a second dataset into the first machine learning model to obtain a first set of predictions. The first set of predictions may be outputted by the first machine learning model based on the first machine learning model processing the second dataset. The second dataset may have data collected, for example, at a different point in time or from different entities (e.g., the compare dataset may have a different population than the training dataset). However, the compare dataset should have at least some parameters (e.g., features) that are the same as the first (e.g., training) dataset.

In some embodiments, the second dataset may include financial data for a plurality of users. For example, the second dataset may include credit scores, loan amounts, net worth amounts, and other financial data for a plurality of users. Each of these parameters may correspond to a feature of the second dataset. FIG. 2 illustrates an excerpt from an exemplary second dataset. FIG. 2 shows table 200 that includes multiple parameters. Parameter 202 represents a user identifier which may be a string of text, a hexadecimal number, a decimal number, or another suitable identifier. Parameter 204 represents a credit score of the associated user while parameter 206 represents a loan amount of the associated user and parameter 208 represents a net worth of that user. Each parameter may be a feature that the machine learning model may use. The same features/parameters may be included in the first dataset used to train the first model and/or the second model.

Testing subsystem 116 may receive a second set of predictions. The second set of predictions may be outputted by the second machine learning model based on the second machine learning model processing the second dataset. For example, the second machine learning model may be an in-production machine learning model that has been trained to output predictions. In some embodiments, the first dataset and the second dataset may be the same dataset. For example, testing subsystem 116 may receive a dataset that includes a plurality of features (e.g., columns) and a plurality of entries (e.g., rows). The received dataset may include a feature (e.g., a column) that stores observations (e.g., actual values) for the target variable. Those observations and the other features and entries may be input into the first/overfitted machine learning model to train that first/overfitted machine learning model. The received dataset may also include a feature (e.g., a column) storing the second set of predictions.

Testing subsystem 116 may split, based on one or more features, the second dataset into a plurality of groups of entries. Each group may be referred to as "bin." Each group of the plurality of groups may be associated with a corresponding category. For example, testing subsystem 116 may generate a plurality of data structures for the second dataset based on a parameter within the second dataset. Each data structure of the plurality of data structures may be associated with a different range of parameter values for the parameter. The data structures may be referred to as bins for assignment of entries. Each bin may have one or more entries assigned to it. The entries assigned to each bin may include a subset of entries of the second dataset (e.g., compare dataset) such that each subset of entries corresponds to a specific category of data or a specific range of parameter values for the selected parameter. Testing subsystem 116 may select one or more of those parameters (features) for generating bins. For example, testing subsystem 116 may select "credit scores" as the parameter for generating category specific data.

For example, testing subsystem 116 may generate data structures/bins for credit scores between 501 and 600 (first bin/data structure), 601 and 700 (second bin/data structure), 701 and 800 (third bin/data structure), and 801 and 850 (fourth bin/data structure). Thus, entry 210 of FIG. 2 may be assigned to the third bin/data structure, entry 212 may be assigned to the fourth bin/data structure, entries 214 and 216 may be assigned to the second bin/data structure, and entry 218 may be assigned to the first bin/data structure.

When testing subsystem 116 assigns the entries to the bins/data structures, testing subsystem 116 may obtain the first set of entries via a first data structure of the plurality of data structures. The range of parameter values associated with the first data structure may correspond to the category. For example, using the table in FIG. 2, testing subsystem 116 may select the second bin/data structure and obtain entries 214 and 216 as well as any other entries of the second dataset that are not shown in the table of FIG. 2.

In some embodiments, testing subsystem 116 may use decision trees to generate bins/data structures for the second dataset. In particular, testing subsystem 116 may select a first parameter within the second dataset, the first parameter corresponding to a full range of first parameter values within the second dataset. To continue with the example above, testing subsystem 116 may select "credit score" parameter from the second dataset. The credit score parameter may include credit scores from a plurality of individuals ranging from 300 to 850.

Testing subsystem 116 may use the credit scores to generate a decision tree. That is, testing subsystem 116 may generate a decision tree for the first parameter based on the full range of first parameter values. Testing subsystem 116 may use one of various algorithms to generate the decision tree. For example, testing subsystem 116 may use Iterative Dichotomiser 3, C4.5, Classification and Regression Tree (CART), Chi-square automatic interaction detection, or another suitable algorithm.

When the decision tree is generated, testing subsystem 116 may input the second dataset into the decision tree to classify entries of the second dataset into the plurality of data structures. Each data structure of the plurality of data structures may correspond to a subrange of the full range of first parameter values. As described in the example above, each data structure may correspond to a subset of credit scores in FIG. 2. In some embodiments, the system may employ a minimum value for the number of data structures/bins. Thus, testing subsystem 116 may determine a minimum value for a minimum number of data structures for the plurality of data structures. Testing subsystem 116 may retrieve the minimum value from a storage location and/or receive that value from a particular use. Testing subsystem 116 may input the minimum value into the decision tree to obtain the plurality of data structures having a number of data structures equal to or greater to the minimum value. FIG. 3 may represent an excerpt of a data structure/bin 300 for a subset of parameter values of parameter 302. Parameter 302 is a credit score parameter and the table of FIG. 3 illustrates a data structure/bin corresponding to credit scores between 600 and 700.

When a decision tree is generated and the entries of the second dataset are classified into the appropriate data structures/bins, testing subsystem 116 may test the performance/accuracy of both the first machine learning model and the second machine learning model.

The predictions for the first and second machine learning models may be analyzed for accuracy. For example, FIG. 2 illustrates an outcome value 220 for each data row. Testing subsystem 116 may compare the outcome for each entry with a prediction and determine how accurate each machine learning model is for that particular category (e.g., that particular bin). FIG. 2 illustrates the outcome as a binary outcome. The binary outcome may be for a result such as a cash out of an account. The value "true" may represent that the corresponding person performed a cash out action while the value false may represent that the corresponding person did not perform the cash out action. The outcome value may not be a binary value. For example, it may be a continuous value or a value within a particular range. In some embodiments, the outcome may be a value from a set of particular values.

When the entries of the second dataset have been split according to groups/bins as described above, testing subsystem 116 may determine which model is more accurate (e.g., the in-production model or the overfitted model). Thus, testing subsystem 116 may determine that a prediction difference between a first subset of the first set of predictions and a second subset of the second set of predictions satisfies a difference threshold. The first subset and the second subset may both correspond to a first group of the plurality of groups. For example, testing subsystem 116 may select each bin sequentially or simultaneously for processing. Testing subsystem may compare the first subset of predictions of the first machine learning model (e.g., predictions for the selected bin by the overfitted model) and the second subset of predictions of the second machine learning model (e.g., predictions of the in-production machine learning model) to the observations (e.g., observations received with the second dataset) to determine which model is more accurate. In addition, testing subsystem 116 may compare the difference with the difference threshold to determine whether the difference threshold has been met. Testing subsystem 116 may use this mechanism to compare predictions for other groups/bins. In some embodiments, to determine the prediction difference, testing subsystem 116 may calculate an average of all the predictions in the group/bin for the first machine learning model (e.g., the overfitted model) and the second machine learning model (e.g., the in-production machine learning model). When the average prediction value is calculated, testing subsystem 116 may calculate the prediction difference for those average prediction values.

In response to determining that the prediction difference satisfies the threshold, testing subsystem 116 may generate an alert related to the category to which the first set of entries corresponds. The threshold may indicate whether a certain difference in accuracy between the in-production machine learning model and the overfitted machine learning model should trigger a particular action. For example, if the overfitted machine learning model is more accurate than the in-production machine learning model by a particular percentage (e.g., 5%, 10%, 15%, etc.), testing subsystem 116 may trigger an alert. This process may be repeated for each data structure/bin to perform the determinations for each "category". In addition, this process may be repeated for one or more other features/parameters of the dataset to determine other categories of data which may trigger results that are less accurate than a threshold.

In some embodiments, testing subsystem 116 may perform the following operations to determine that the prediction difference between the first subset and the second subset of predictions satisfies the difference threshold. Testing subsystem 116 may generate a first prediction score for the first subset of predictions and a second prediction score for the second subset of predictions. The first prediction score may be an aggregated score for all predictions for the entries of a particular group/bin associated with a particular category. The first prediction score may be a score generated by comparing predictions from the first machine learning model with the actual outcomes for each entry. The second prediction score may be a score generated by comparing predictions from the second machine learning model with the actual outcomes for each entry. In some embodiments, each of the first prediction score and the second prediction score may be a total difference score between the outcomes and the predictions. In some embodiments, each of the first prediction score and the second prediction score may be an average difference.

Testing subsystem 116 may determine the prediction difference between the first prediction score and the second prediction score. For example, testing subsystem 116 may determine whether the first machine learning model (e.g., the overfitted model) or the second machine learning model (e.g., the in-production model) is more accurate and how much more accurate (e.g., the difference in accuracy values). Testing subsystem 116 may then determine that the prediction difference satisfies the difference threshold. For example, the threshold may be a percentage or a ratio.

Figure 4:
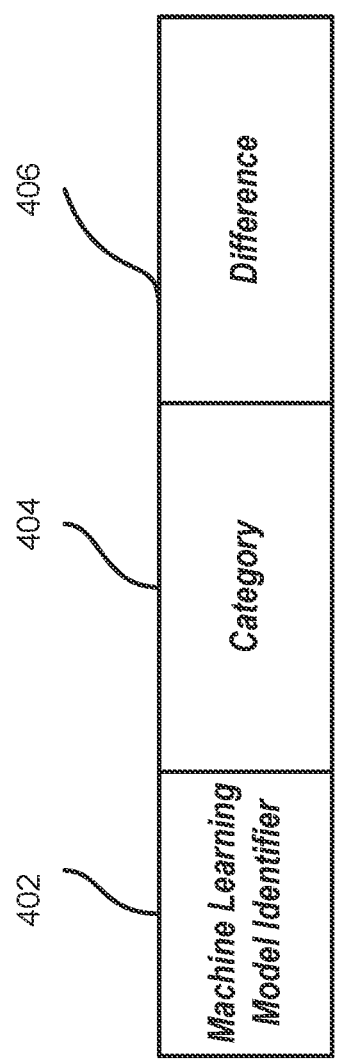
FIG. 4 illustrates a data structure that may store the alert details, in accordance with one or more embodiments.

Testing subsystem 116 may pass the alert to output subsystem 118. Output subsystem 118 may transmit an alert to an administrator of the second (e.g., in-production) machine learning model. The alert may include the identifier of the second machine learning model, the category of data that the alert has been triggered for (e.g., the bin definition), the difference value, and/or other parameters. FIG. 4 illustrates a data structure that may store the alert details. Field 402 may include the machine learning model identifier and field 404 may include the category of data (e.g., group/bin definition). For example, field 404 may include the rule that places the data into the bin. Field 406 may store the difference between the models (e.g., a percentage or a ratio). In some embodiments, the alert may include one or more selectable options enabling the administrator to address the issue. The options may include an option to re-train the machine learning model, to generate an alternative machine learning model for the category of data, to monitor for incoming data matching the category, and/or other options.

In some embodiments, an alternative machine learning model may be trained for categories that are not as accurate as desired (e.g., based on the process describe above). Thus, testing subsystem 116 may pass data indicating which data structure/bins include entries for which the second (e.g., in-production) machine learning model is not performing as well as required to training subsystem 114. Training subsystem 114 may train an alternative machine learning model using an updated first dataset. The updated first dataset may be a dataset associated with a category to which the second dataset corresponds. For example, training subsystem 114 may extract from the first dataset (the training dataset) entries matching a particular data structure/bin as generated based on the second dataset. For example, as shown in FIG. 2, if the second machine learning model is not accurate enough for credit scores between 600 and 700 and those scores are part of a particular bin/data structure, training subsystem 114 may extract, from the first dataset (e.g., the original training dataset), entries matching the particular bin/data structure and use those entries to train the alternative machine learning model. Training subsystem 114 may then provide the alternative machine learning model for data processing.

In some embodiments, instead of or in addition to generating an alternative machine learning model, the model monitoring system may adjust execution of the machine learning model for the particular group (e.g., bin) and/or generate an additional layer for any data matching the group that is received for processing by the machine learning model.

In some embodiments, performance monitoring system 102 may monitor for incoming data matching those bins that have associated alternative machine learning models or additional processing layers. Monitoring may be performed by output subsystem 118. Thus, output subsystem 118 may determine that the second (e.g., in-production) machine learning model generated a prediction from input data matching a group/bin that is associated with an alternative machine learning model, an additional layer, or adjusted output parameters. In response to the second machine learning model receiving the data matching the group/bin, output subsystem 118 may perform a task corresponding to the machine learning adjustment being made for the particular group/bin. For example, output subsystem 118 may input the input data matching the group/bin into the alternative machine learning model, and provide an alternative prediction outputted by the alternative machine learning model. In another example, output subsystem 118 may execute the second/in-production machine learning model with parameter adjustments or layer adjustments determined based on processing above. In some embodiments, output subsystem 118 may transmit, to the user that input the data matching the group/bin, an output of both the in-production machine learning model and the overfitted machine learning model. The transmission may include an explanation of the two values and why the two values may differ.

Detecting Category-Specific Bias Using Residual Values

Another mechanism for detecting model bias is to use residual values of two datasets (e.g., a training dataset and a compare dataset) to compare residuals for specific categories of data. Thus, performance monitoring system 102 may detect category-specific model bias and/or present alternative predictions based on residual values outputted by a machine learning model. This mechanism for detecting category-specific bias may use one or more of the same subsystems (communication subsystem 112, training subsystem 114, testing subsystem 116, output subsystem 118) as discussed above in relation to detecting category-specific bias using an overfitted machine learning model.

Testing subsystem 116 may generate a plurality of groups based on a parameter within a first dataset. Each group of the plurality of groups may be associated with a different range of parameter values for the parameter. Each group may correspond to a bin or a data structure as discussed above. For example, testing subsystem 116 may generate a plurality of data structures/bins for the dataset based on a parameter within the that dataset. Each data structure/bin of the plurality of data structures may be associated with a different range of parameter values for the parameter. The data structures may be referred to as bins for assignment of entries. Each bin may have one or more entries assigned to it. The entries assigned to each bin may include a subset of entries of the second dataset (e.g., compare dataset) such that each subset of entries corresponds to a specific category of data or a specific range of parameter values for the selected parameter. As discussed above, a decision tree may be used to generate the bins for the corresponding groups. Furthermore, the groups may be generated based on the illustration in FIG. 2 and the accompanying disclosure above.

In some embodiments, the machine learning model may have been trained using the first dataset which may be referred to as a training dataset. The second dataset may be a compare dataset with data that may have been collected at a different time and may involve a different population. The error values discussed below may correspond to residual values associated with any prediction. The residual value may be a difference between the predicted outcome and the actual outcome recorded in the dataset. For example, if the outcome corresponds to a value of 1 and the prediction corresponds to a value of 9, the residual value is 0.1.

In some embodiments, testing subsystem 116 may perform the following operations when generating the plurality of groups. Testing subsystem 116 may select a first parameter within the first dataset. The first parameter may correspond to a set of parameter values. For example, the first parameter may be a feature of the dataset (e.g., parameter 502 or parameter 504 as illustrated in FIG. 5). Testing subsystem 116 may extract the parameter values from the first dataset and generate groups from those values. For example, testing subsystem 116 may use a decision tree to generate the groups, by determining which values or ranges of values to assign to which group. Thus, testing subsystem 116 may generate a plurality of group definitions for a set of parameter values such that each group definition is associated with a subset of the set of parameter values.

Testing subsystem 116 may select a first group of the plurality of groups. For example, testing subsystem may select a first data structure/bin for processing. Testing subsystem 116 may iterate through each group by selecting entries of each data structure/bin and performing operations described below for each group. The processing may be performed serially or in parallel (e.g., using multiple processors). Testing subsystem 116 may iteratively select each group of the plurality of groups for processing. In some embodiments, testing subsystem 116 may generate groups using different parameters and/or multiple parameters and assign the matching entries to those groups. As illustrated in FIG. 3, one group may be a group of entries where the credit score for each entry is between 600 and 700. Other groups may include entries where credit scores are in other ranges (e.g., 700 to 800, 800 to 850, etc.).

The groups may also include groups of entries associated with a different parameter. For example, FIG. 5 illustrates a table 500 representing a group where parameter 502 (corresponding to the net worth associated with each entry) is in the range of 100,000 to 200,000. In some embodiments, the groups may be based on multiple parameters (e.g., parameter 502 and parameter 504). Those groups may be referred to as multi-variate groups. In some embodiments, groups based on a single parameter and groups based on multiple parameters may be processed by the testing subsystem 116. Each group may be processed sequentially or in parallel.

When a group is selected, testing subsystem 116 may obtain a first set of entries from the first dataset and a second set of entries from a second dataset such that the first set of entries and the second set of entries match the first group. For example, testing subsystem 116 may obtain entries matching a particular range of net worth. In some embodiments, the group definition may be stored in a data structure, and testing subsystem 116 may extract the group definition from the data structure. For example, FIG. 6 illustrates a data structure 600 that includes group identifiers and associated group definitions. Column 603 stores group identifiers while column 606 stores group definitions. Group 609 illustrates a single parameter/single variable group, where parameter A is in the range of 601-700, while group 612 is a multi-parameter/multi-variate group.

In some embodiments, testing subsystem 116 may perform the following operations when obtaining the first set of entries from the first dataset. Testing subsystem 116 may determine, for each entry in the first dataset, a group definition of the plurality of group definitions that matches a parameter value for the entry. For example, testing subsystem 116 may iterate through each entry within the first dataset and compare the fields of the entry to the plurality of group definitions and assign the entry to one or more groups that the entry matches. FIG. 6 illustrates the group definitions that testing subsystem 116 may use. Thus, in some embodiments, each entry may be assigned to multiple groups.

Testing subsystem 116 may assign each entry of the first dataset to a group of the plurality of groups according to the determination. For example, testing subsystem 116 may generate a plurality of pointers for each group that indicate the entries that are part of that group.

Testing subsystem 116 may input the first set of entries into a machine learning model to obtain a first set of error values. That is, the first set of error values is outputted by the machine learning model based on the machine learning model's processing of the first set of entries. The error values may be residual values outputted by the machine learning model in addition to the prediction for each entry. For example, if the output of the machine learning model is a probability of a particular outcome being "True" or "False" and the probability of that output is 80%, then the residual value may be 20%. Testing subsystem 116 may iterate through each entry in the first set and store the resulting error values (e.g., residual values).

In some embodiments, testing subsystem 116 may sort the parameter values to assign the parameter values to a corresponding group. Testing subsystem 116 may determine a type of data associated with the first group. For example, the type of data may be decimal, string, hexadecimal, or another suitable type. Testing subsystem 116 may sort, according to the type of data, the parameter values associated with the first group. For example, if the parameter values are numerical, testing subsystem 116 may sort the values according to the numerical (e.g., decimal or hexadecimal) values (e.g., in ascending or descending order). If the parameter values are string values, testing subsystem 116 may sort the values in alphabetical order. In some embodiments, testing subsystem 116 may determine that the parameter values represent a set of, for example, five or six values. Thus, testing subsystem 116 may sort the parameter values according to the values in the set.

Testing subsystem 116 may also determine a number of groups for the parameter. For example, if the parameter values represent a set of values, each value of the set may correspond to a group. In some embodiments, testing subsystem 116 may determine the number of groups based on the number of entries that would be assigned to each group. For example, testing subsystem 116 may attempt to balance the groups so that not too many entries are in a particular group. In some embodiments, testing subsystem 116 may retrieve a minimum group value that corresponds to a minimum number of groups desired. Testing subsystem 116 may use that value in generating the groups. Testing subsystem 116 may then assign entries of the first dataset to the plurality of groups according to the sorting.

Testing subsystem 116 may input the second set of entries into the machine learning model to obtain a second set of error values. That is, the second set of error values outputted by the machine learning model based on the machine learning model's processing of the second set of entries. The processing of the second set may be performed in the same manner as the processing of the first set. For example, if the output of the machine learning model is a probability of a particular outcome being "True" or "False" and the probability of that output is 75%, then the residual value may be 25%. Testing subsystem 116 may iterate through each entry in the second set and store the resulting error values (e.g., residual values).

In response to determining that a difference between the first set of error values and the second set of error values satisfies an error threshold, testing subsystem 116 may generate a notification and pass the notification to communication subsystem 112. Communication subsystem 112 may transmit a notification to a user indicating the first group. For example, communication subsystem 112 may transmit the notification to one or more of computing devices 108a-108n.

In some embodiments, testing subsystem 116 may determine a difference between the first set of errors (first set of residual values) and the second set of errors (the second set of residual values) using error scores (e.g., residual scores). Testing subsystem 116 may determine a first error (residual) score for the first set of entries and a second error (residual) score for the second set of entries. For example, testing subsystem 116 may generate a first average value for the first set of error values and a second average value for the second set of error values. In some embodiments, to generate the average values, testing subsystem 116 may add all the error values (residual values) for the first set of entries and calculate an average. Testing subsystem 116 may perform the same operations on the error values (residual values) of the second set of entries. Testing subsystem 116 may calculate the difference between the first and second sets of error values based on the first error score and the second error score. Testing subsystem 116 may retrieve a threshold amount and then determine based on the scores and the threshold whether the difference is higher than the threshold amount.

In some embodiments, as described above, testing subsystem 116 may cause a generation of an alternative machine learning model for groups where the difference is higher than the threshold amount. Testing subsystem 116 may pass the threshold comparison result to training subsystem 114. In response to determining that the difference between the first set of error values and the second set of error values satisfies the error threshold, training subsystem 114 may use the first set of entries from the first dataset to train an alternative machine learning model. For example, training subsystem 114 may input the first set of entries into an untrained machine learning model with a command to train the machine learning model based on the inputted entries.

Training subsystem 114 may pass the trained alternative machine learning model to testing subsystem 116 for use in generating predictions for incoming data that matches the group definition associated with the alternative machine learning model. Thus, in response to the machine learning model generating a prediction from production data input matching the first group, testing subsystem 116 may input the production data input into the alternative machine learning model and present an alternative prediction outputted by the alternative machine learning model in connection with presentation of the prediction of the machine learning model. For example, training subsystem 114 may generate an alternative machine learning model for a group of entries where the credit score (e.g., parameter 302 of FIG. 3) is between 600 and 700 (e.g., as illustrated in FIG. 3). Thus, when the production system receives a request for a prediction and the entry includes a parameter 302 where the parameter value is between 600 and 700, the testing subsystem 116 may pass that entry to the alternative machine learning model to obtain a prediction for the entry. Testing subsystem 116 may pass the prediction from the alternative machine learning model to output subsystem 118. Output subsystem 118 may generate an output that includes both the prediction from the production machine learning model and the alternative machine learning model with an explanation as to why two predictions have been generated. Furthermore, output subsystem 118 may output the associated group and/or group definition. Output subsystem 118 may transmit the output to one or more of computing devices 108a-108n.

Computing Device Components

Figure 7:
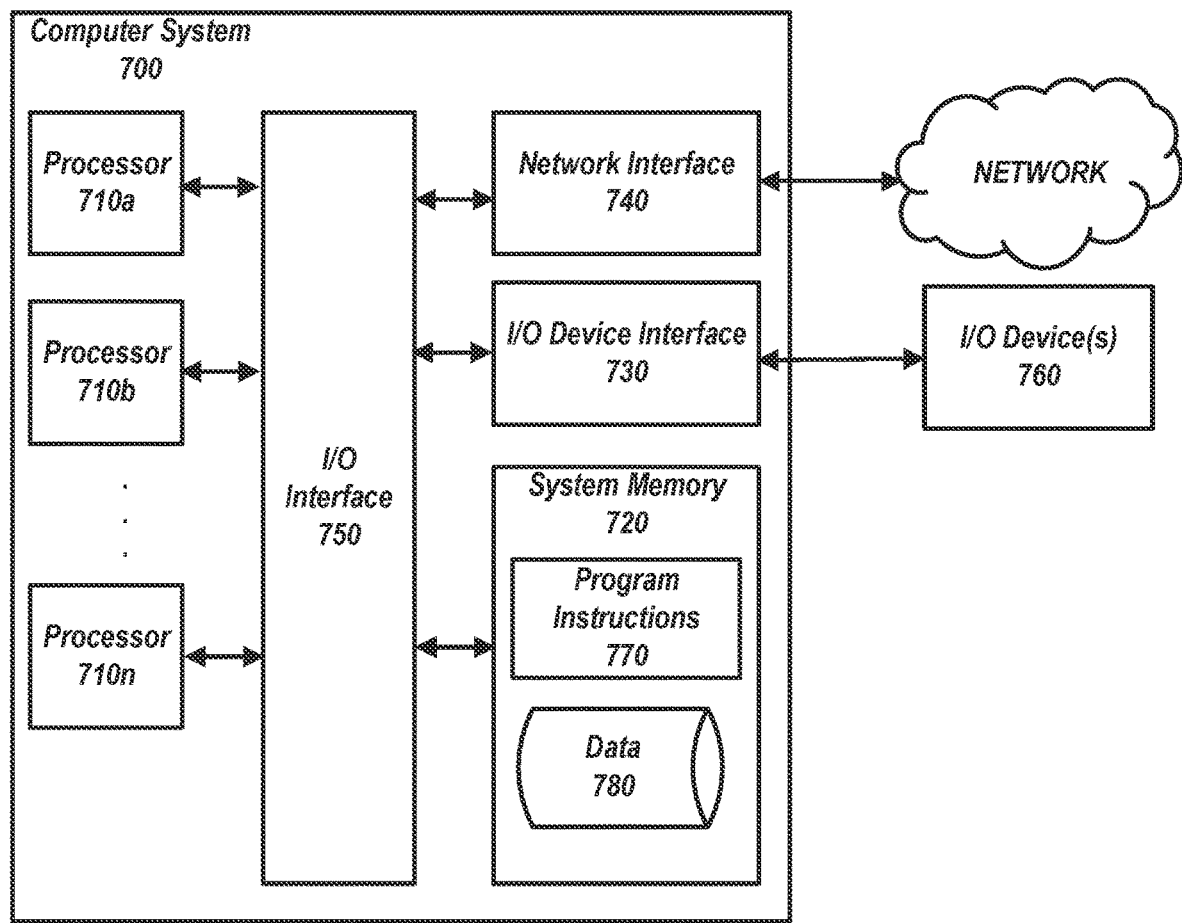
FIG. 7 shows an example computing system that may be used in accordance with one or more embodiments.

FIG. 7 shows an example computing system that may be used in accordance with some embodiments of this disclosure. Specifically, performance monitoring system 102, data node 104 and/or computing devices 108a-108n may use one or more of the components described below. In some instances, computing system 700 is referred to as a computer system. A person skilled in the art would understand that those terms may be used interchangeably. The components of FIG. 7 may be used to perform some or all operations discussed in relation with FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output I/O device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710*a*-710*n*) to implement one or more embodiments of the present techniques. Program instructions 770 may include modules of computer program instructions for implementing one or more techniques described herein with regard to various processing modules. Program instructions 770 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 720 may include a non-transitory computer readable storage medium that may have program instructions stored thereon that are executable by a computer processor (e.g., one or more of processors 710*a*-710*n*) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710*a*-710*n*, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710*a*-710*n*). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700, or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 700 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Machine Learning Examples

Figure 8:
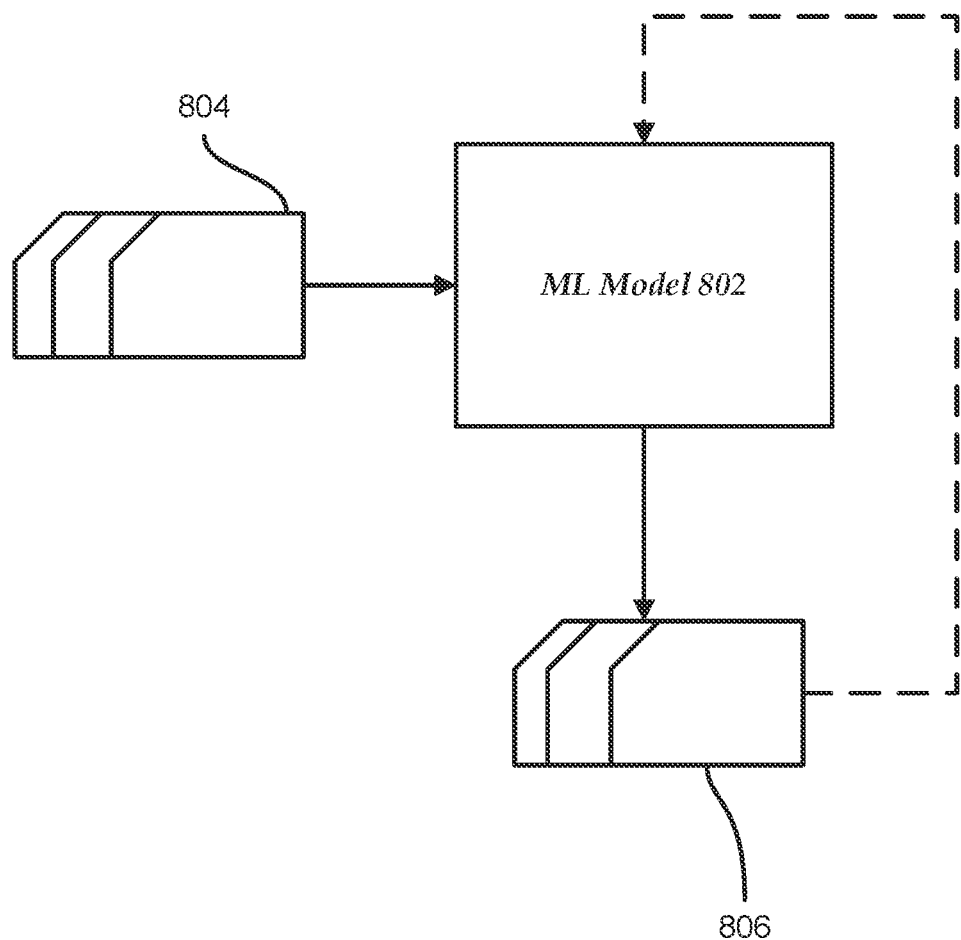
FIG. 8 illustrates an exemplary machine learning model, in accordance with some embodiments of this disclosure.

The operations descried in this disclosure may be used for various machine learning models and machine learning model types. FIG. 8 illustrates an exemplary machine learning model, in accordance with some embodiments of this disclosure. Machine learning model 802 may take input 804 (e.g., a vector representing a particular section of the text) and may generate output parameters 806 which may be one or more predictions and/or residuals.

The output parameters 806 may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source), and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model may be self-learning and/or trained rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general purpose supervised learning algorithm that the system uses for both classification and regression tasks. Alternatively, the machine learning model may include a Bayesian model configured to perform variational inference on the graph and/or vector.

Computing Operation Flow

Figure 9:
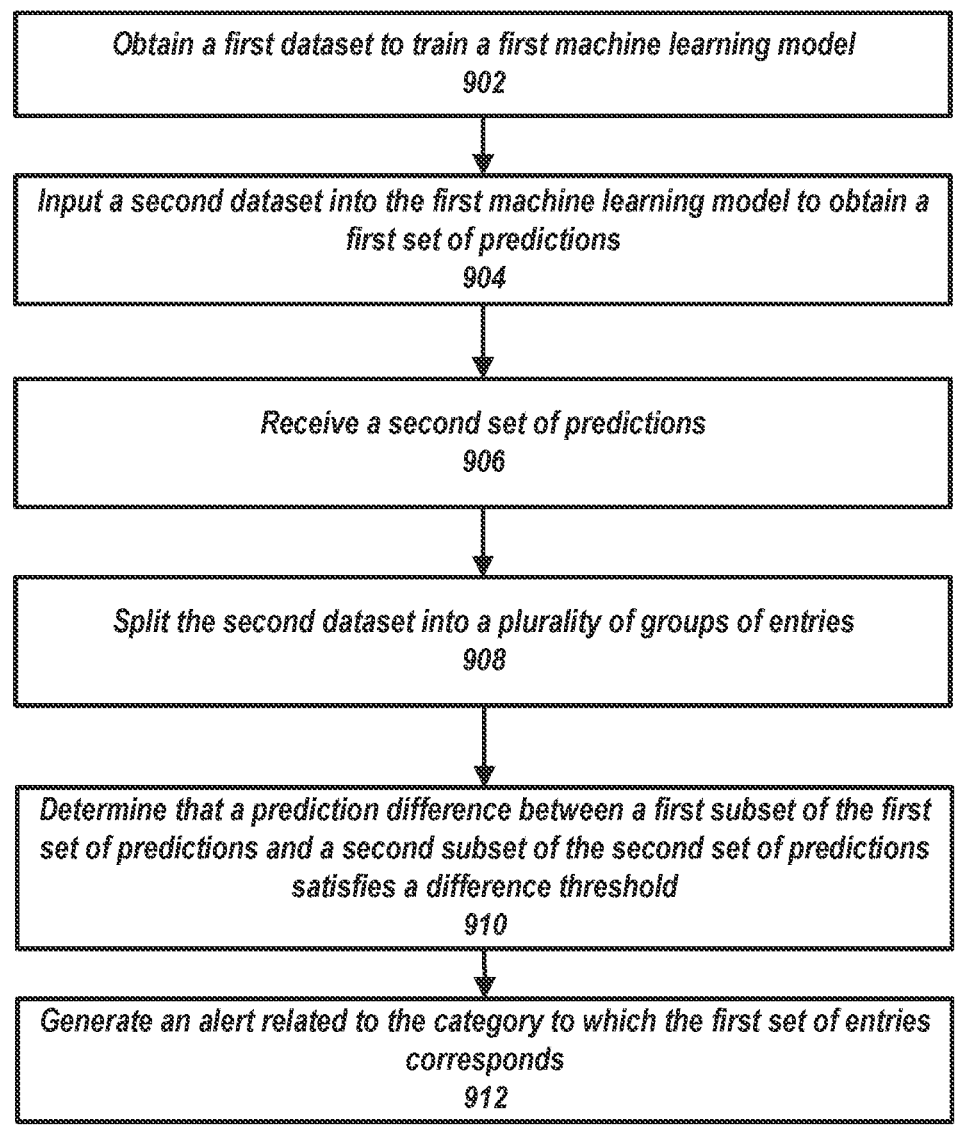
FIG. 9 is a flowchart of operations for the mechanism for detecting model bias using a test model, in accordance with one or more embodiments.

FIG. 9 is a flowchart 900 of operations for the mechanism for detecting model bias using a test model (e.g., an overfitted model) to compare predictions for specific categories of data. The operations of FIG. 9 may use components described in relation to FIG. 7 and may be performed on machine learning models described in FIG. 8. At 902, performance monitoring system 102 obtains a first dataset to train a first machine learning model. Performance monitoring system 102 may obtain the first dataset from system memory 720. In some embodiments, performance monitoring system 102 may obtain the first dataset from data node 104 via network 150. Performance monitoring system 102 may use network interface 740 in this operation.

At 904, performance monitoring system 102 inputs a second dataset into the first machine learning model to obtain a first set of predictions. Performance monitoring system 102 may use one or more processors 710*a*-710*n* to perform the input operation(s) via an API associated with the first machine learning model.

At 906, performance monitoring system 102 receives a second set of predictions. Performance monitoring system 102 may use one or more processors 710*a*-710*n* to perform the receiving operations. Performance monitoring system 102 may receive the second set of predictions through network interface 740 (FIG. 7) from network 150 (FIG. 1). Performance monitoring system 102 may receive the predictions as part of a received dataset. The received dataset may include features and entries as well as observations (real values) and predictions for each entry from the second machine learning model (e.g., the in-production machine learning model). Thus, performance monitoring system 102 may train the first machine learning model using the received dataset and the observations and then generate predictions from the first (overfitted model) using the same dataset. That is, in some embodiments, the first dataset and the second data set include the same entries except the first dataset (for training the first/overfitted model) includes observations as the target variable, while the second dataset (for getting predictions from the overfitted model) does not include the observations.

At 908, performance monitoring system 102 splits the second dataset into a plurality of groups of entries. Performance monitoring system 102 may perform the split using one or more processors 710*a*-710*n* via operations described above. At 910, performance monitoring system 102 determines that a prediction difference between a first subset of the first set of predictions and a second subset of the second set of predictions satisfies a difference threshold. Performance monitoring system 102 may make the determination using one or more processors 710*a*-710*n* via operations described above. At 912, performance monitoring system 102 generates an alert related to the category to which the first set of entries corresponds. For example, performance monitoring system 102 may generate an alert described above using processors 710*a*-710*n* and store the alert in system memory 720. Performance monitoring system 102 may transmit the alert (e.g., using network interface 740) through network 150 to, for example, one or more computing devices 108*a*-108*n*.

The techniques for detecting model bias using a test model (e.g., an overfitted model) to compare predictions for specific categories of data will be better understood with reference to the following enumerated embodiments:

1. A method comprising: obtaining a first dataset to train a first machine learning model for testing a second machine learning model, wherein the first dataset comprises a plurality of features; inputting a second dataset into the first machine learning model to obtain a first set of predictions, the first set of predictions outputted by the first machine learning model based on the first machine learning model processing the second dataset; receiving a second set of predictions, wherein the second set of predictions is outputted by the second machine learning model based on the second machine learning model processing the second dataset; splitting, based on one or more features, the second dataset into a plurality of groups of entries, wherein each group of the plurality of groups is associated with a corresponding category; determining that a prediction difference between a first subset of the first set of predictions and a second subset of the second set of predictions satisfies a difference threshold, wherein the first subset and the second subset both corresponds to a first group of the plurality of groups; and in response to determining that the prediction difference satisfies the difference threshold, generating an alert related to a category corresponding to the first group.

2. Any of the proceeding embodiments, further comprising: training an alternative machine learning model using data associated with the first group; and providing the alternative machine learning model for data processing.

3. Any of the proceeding embodiments, further comprising: determining that the second machine learning model received input data matching the category; in response to determining that the second machine learning model received the input data matching the category, inputting the input data matching the category into the alternative machine learning model; and obtaining an alternative prediction outputted by the alternative machine learning model.

4. Any of the proceeding embodiments, further comprising: generating a plurality of data structures for the second dataset based on a parameter within the second dataset, wherein each data structure of the plurality of data structures is associated with a different range of parameter values for the parameter; dividing entries of the second dataset into the plurality of data structures according to a corresponding parameter value for the parameter for each entry in the second dataset; and obtaining the first group via a first data structure of the plurality of data structures, wherein a range of parameter values associated with the first data structure corresponds to the category.

5. Any of the proceeding embodiments, wherein generating the plurality of data structures for the second dataset comprises: selecting a first parameter within the second dataset, the first parameter corresponding to a full range of first parameter values within the second dataset;
   generating a decision tree for the first parameter based on the full range of first parameter values; and inputting the second dataset into the decision tree to classify entries of the second dataset into the plurality of data structures, wherein each data structure of the plurality of data structures corresponds to a subrange of the full range of first parameter values.

6. Any of the proceeding embodiments, wherein generating the plurality of data structures comprises: determining a minimum value for a minimum number of data structures for the plurality of data structures; and inputting the minimum value into the decision tree to obtain the plurality of data structures having a number of data structures equal to or greater to the minimum value.

7. Any of the proceeding embodiments, further comprising: adjusting parameters of the second machine learning model that correspond to the first group; and in response to the second machine learning model receiving data input matching the first group, using the parameters of the second machine learning model to generate a prediction from the second machine learning model.

8. Any of the proceeding embodiments, wherein determining that the prediction difference between the first subset and the second subset satisfies the difference threshold comprises: generating a first prediction score for the first set of predictions and a second prediction score for the second set of predictions; determining the prediction difference between the first prediction score and the second prediction score; and determining that the prediction difference satisfies the difference threshold.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

Figure 10:
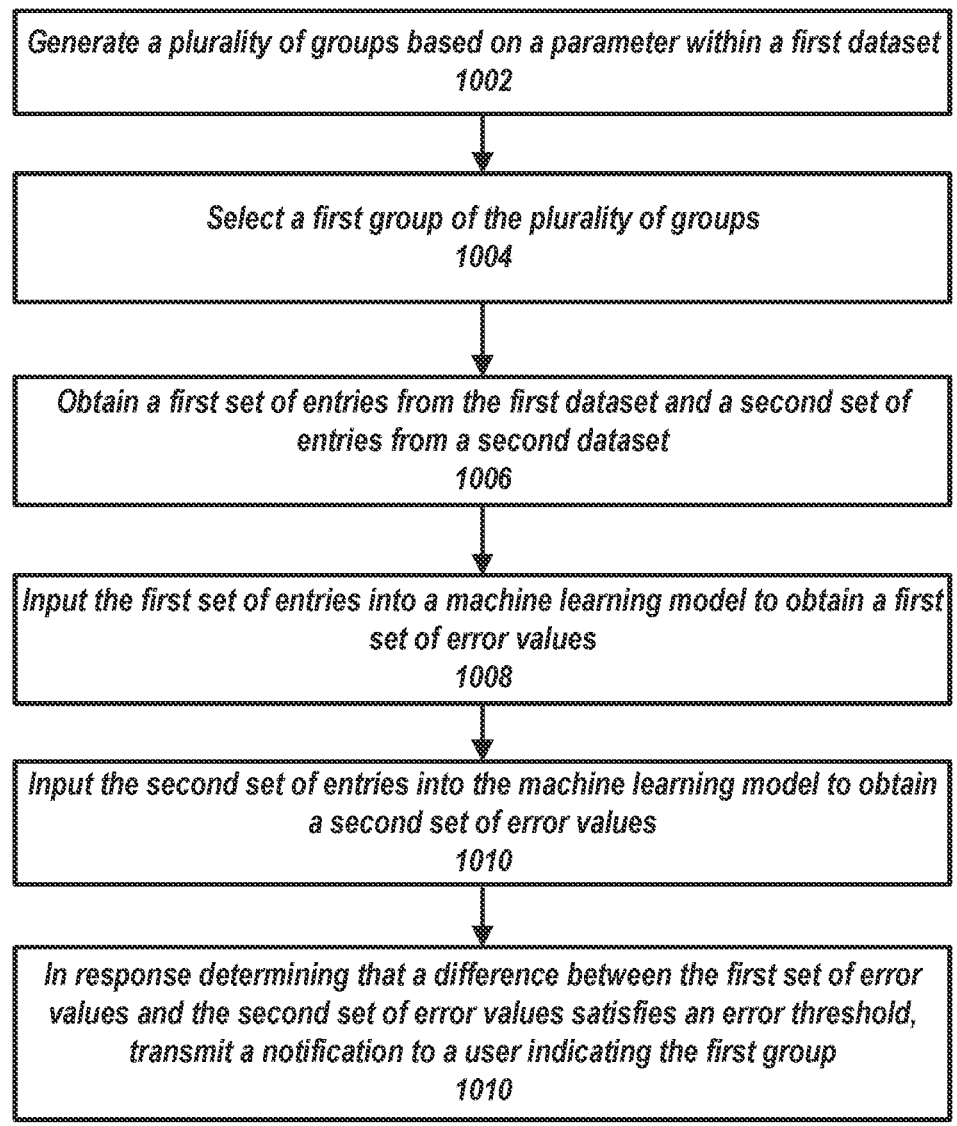
FIG. 10 is a flowchart 1000 of operations for the mechanism for detecting model bias using residual values of two datasets (e.g., a training dataset and a compare dataset) to compare residuals for specific categories of data, in accordance with one or more embodiments.

FIG. 10 is a flowchart 1000 of operations for the mechanism for detecting model bias using residual values of two datasets (e.g., a training dataset and a compare dataset) to compare residuals for specific categories of data. The operations of FIG. 10 may use components described in relation to FIG. 7 and may be performed on machine learning models described in FIG. 8. At 1002, performance monitoring system 102 generates a plurality of groups based on a parameter within a first dataset. For example, performance monitoring system 102 may use processors 710a-710n to generate the groups and store the associated data structure(s) in system memory 720.

At 1004, performance monitoring system 102 selects a first group of the plurality of groups. For example, performance monitoring system 102 may iterate through each group and perform the following operations on each group. When selecting each group, performance monitoring system 102 may retrieve an associated group definition from system memory 720 using one or more processors 710a-710n.

At 1006, performance monitoring system 102 obtains a first set of entries from the first dataset and a second set of entries from a second dataset. Performance monitoring system 102 may obtain the entries from system memory 720. In some embodiments, performance monitoring system 102 may obtain the entries from a different system (e.g., data node 104) via network 150 using network interface 740.

At 1008, performance monitoring system 102 inputs the first set of entries into a machine learning model to obtain a first set of error values. Performance monitoring system 102 may use one or more processors 710a-710n to perform the input operation(s) via an API associated with the machine learning model. In some embodiments, the first set of entries may correspond to input 804 and ML model 802 may correspond to the machine learning model. The residual values may be included in output parameters 806.

At 1010, performance monitoring system 102 inputs the second set of entries into the machine learning model to obtain a second set of error values. Performance monitoring system 102 may use one or more processors 710a-710n to perform the input operation(s) via an API associated with the machine learning model. In some embodiments, the first set of entries may correspond to input 804 and ML model 802 may correspond to the machine learning model. The residual values may be included in output parameters 806.

At 1012, performance monitoring system 102, in response to determining that a difference between the first set of error values and the second set of error values satisfies an error threshold, transmits a notification to a user indicating the first group. For example, performance monitoring system 102 may generate an alert described above using processors 710a-710n and store the alert in system memory 720. Performance monitoring system 102 may transmit the alert (e.g., using network interface 740) through network 150 to, for example, one or more computing devices 108a-108n.

The techniques for detecting model bias using residual values of two datasets (e.g., a training dataset and a compare dataset) to compare residuals for specific categories of data will be better understood with reference to the following enumerated embodiments:

1. A method comprising: generating a plurality of groups based on a parameter within a first dataset, wherein each group of the plurality of groups is associated with a different range of parameter values for the parameter; selecting a first group of the plurality of groups; obtaining a first set of entries from the first dataset and a second set of entries from a second dataset where the first set of entries and the second set of entries match the first group; inputting the first set of entries into a machine learning model to obtain a first set of error values, the first set of error values outputted by the machine learning model based on the machine learning model's processing of the first set of entries; inputting the second set of entries into the machine learning model to obtain a second set of error values, the second set of error values outputted by the machine learning model based on the machine learning model's processing of the second set of entries; and in response to determining that a difference between the first set of error values and the second set of error values satisfies an error threshold, transmitting a notification to a user indicating the first group.

2. Any of the proceeding embodiments, wherein generating the plurality of groups comprises: selecting a first parameter within the first dataset, wherein the first parameter corresponds to a set of parameter values; and generating a plurality of group definitions for a set of parameter values, wherein each group definition is associated with a subset of the set of parameter values.

3. Any of the proceeding embodiments, wherein obtaining the first set of entries from the first dataset comprises: determining, for each entry in the first dataset, a group definition of the plurality of group definitions that matches a parameter value for the entry; and assigning each entry of the first dataset to a group of the plurality of groups according to the determination.

4. Any of the proceeding embodiments further comprising: determining a type of data associated with the first group; sorting, according to the type of data, the parameter values associated with the first group; determining a number of groups for the parameter; and assigning entries of the first dataset to the plurality of groups according to the sorting.

5. Any of the proceeding embodiments further comprising: determining a first error score for the first set of entries and a second error score for the second set of entries; and calculating the difference between the first and second sets of error values based on the first error score and the second error score.

6. Any of the proceeding embodiments, wherein determining the first error score for the first set of entries and the second error score for the second set of entries comprises generating a first average value for the first set of error values and a second average value for the second set of error values.

7. Any of the proceeding embodiments further comprising determining the difference between the first set of error values and the second set of error values based on the second error score being higher than the first error score by the error threshold.

8. Any of the proceeding embodiments further comprising: in response to determining that the difference between the first set of error values and the second set of error values satisfies the error threshold, use the first set of entries from the first dataset to train an alternative machine learning model; and in response to the machine learning model generating a prediction from production data input matching the first group, inputting the production data input into the alternative machine learning model and presenting an alternative prediction outputted by the alternative machine learning model in connection with presentation of the prediction of the machine learning model.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

Although the present invention has been described in detail for the purpose of illustration based on what is currently considered to be the most practical and preferred embodiments, it is to be understood that such detail is solely for that purpose, and that the invention is not limited to the disclosed embodiments, but on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A system for detecting category-specific model bias and presenting alternative predictions via overfitted and alternative machine learning models, the system comprising:
one or more processors; and
a non-transitory computer readable storage medium storing instructions which, when executed by the one or more processors, cause the one or more processors to:
obtain a training dataset to train an overfitted machine learning model for testing an in-production machine learning model, wherein the training dataset comprises a plurality of features and a plurality of observations, and wherein the overfitted machine learning model is configured to generate predictions overfitted to the training dataset;
subsequent to using the training dataset to train the overfitted machine learning model, input a compare dataset into the overfitted machine learning model to obtain a first set of predictions, the first set of predictions being outputted by the overfitted machine learning model based on the overfitted machine learning model processing the compare dataset, wherein the compare dataset comprises the plurality of features;

receive a second set of predictions outputted by the in-production machine learning model generated based on the in-production machine learning model processing the compare dataset;

generate a plurality of bins based on one or more features of the plurality of features, wherein a corresponding subset of entries of the compare dataset is assigned to each bin of the plurality of bins;

in response to determining that an average difference between a first subset of the first set of predictions and a second subset of the second set of predictions satisfies a difference threshold, re-train the in-production machine learning model by adjusting a subset of parameters, of a plurality of parameters of the in-production machine learning model, corresponding to a first bin of the plurality of bins, wherein the first subset and the second subset correspond to the first bin of the plurality of bins, wherein the subset of parameters comprises a fewer number of parameters than the plurality of parameters; and in response to the in-production machine learning model receiving data input matching the first bin, using the in-production machine learning model to generate a prediction from the in-production machine learning model.

2. The system of claim 1, wherein the instructions for generating the plurality of bins, when executed by the one or more processors, further cause the one or more processors to:

generate the plurality of bins for the compare dataset based on a parameter within the compare dataset, wherein each bin of the plurality of bins is associated with a different range of parameter values for the parameter; and divide the corresponding subset of entries of the compare dataset into the plurality of bins according to a corresponding parameter value for the parameter for each entry in the compare dataset.

3. The system of claim 2, wherein the instructions further cause the one or more processors to:

select a first parameter within the compare dataset, the first parameter corresponding to a full range of first parameter values within the compare dataset;

generate a decision tree for the first parameter based on the full range of the first parameter values; and input the compare dataset into the decision tree to classify the corresponding subset of entries of the compare dataset into the plurality of bins, wherein each bin of the plurality of bins corresponds to a subrange of the full range of the first parameter values.

4. The system of claim 3, wherein the instructions for generating the plurality of bins cause the one or more processors to:

determine a minimum value for a minimum number of bins for the plurality of bins; and input the minimum value into the decision tree to obtain the plurality of bins having a number of bins equal to or greater to the minimum value.

5. A method comprising:

obtaining a first dataset to train a first machine learning model for testing a second machine learning model, wherein the first dataset comprises a plurality of features;

inputting a second dataset into the first machine learning model to obtain a first set of predictions, the first set of predictions outputted by the first machine learning model based on the first machine learning model processing the second dataset, wherein the second dataset comprises at least one feature of the plurality of features, and wherein the first machine learning model is configured to generate predictions overfitted to the first dataset;

receiving a second set of predictions, wherein the second set of predictions is outputted by the second machine learning model based on the second machine learning model processing the second dataset;

splitting, based on one or more features, entries of the second dataset into a plurality of groups, wherein each group of the plurality of groups is associated with a corresponding category;

determining that a prediction difference between a first subset of the first set of predictions and a second subset of the second set of predictions satisfies a difference threshold, wherein the first subset and the second subset both corresponds to a first group of the plurality of groups;

re-training the second machine learning model, responsive to the prediction difference satisfying the difference threshold, by adjusting a subset of parameters, of a plurality of parameters of the second machine learning model, corresponding to the first group, wherein the subset of parameters comprises a fewer number of parameters than the plurality of parameters; and in response to determining that the prediction difference satisfies the difference threshold, generating an alert related to a category corresponding to the first group.

6. The method of claim 5, further comprising:

training an alternative machine learning model using data associated with the first group; and providing the alternative machine learning model for data processing.

7. The method of claim 6, further comprising:

determining that the second machine learning model received input data matching the category;

in response to determining that the second machine learning model received the input data matching the category, inputting the input data matching the category into the alternative machine learning model; and obtaining an alternative prediction outputted by the alternative machine learning model.

8. The method of claim 5, further comprising:

generating a plurality of data structures for the second dataset based on a parameter within the second dataset, wherein each data structure of the plurality of data structures is associated with a different range of parameter values for the parameter;

dividing the entries of the second dataset into the plurality of data structures according to a corresponding parameter value for the parameter for each entry in the second dataset; and obtaining the first group via a first data structure of the plurality of data structures, wherein a range of parameter values associated with the first data structure corresponds to the category.

9. The method of claim 8, wherein generating the plurality of data structures for the second dataset comprises:

selecting a first parameter within the second dataset, the first parameter corresponding to a full range of first parameter values within the second dataset;

generating a decision tree for the first parameter based on the full range of the first parameter values; and inputting the second dataset into the decision tree to classify the entries of the second dataset into the plurality of data structures, wherein each data structure of the plurality of data structures corresponds to a subrange of the full range of the first parameter values.

10. The method of claim 9, wherein generating the plurality of data structures comprises:

determining a minimum value for a minimum number of data structures for the plurality of data structures; and inputting the minimum value into the decision tree to obtain the plurality of data structures having a number of data structures equal to or greater to the minimum value.

11. The method of claim 5, further comprising:

in response to the second machine learning model receiving data input matching the first group, using the subset of parameters of the second machine learning model to generate a prediction from the second machine learning model.

12. The method of claim 5, wherein determining that the prediction difference between the first subset and the second subset satisfies the difference threshold comprises:

generating a first prediction score for the first subset and a second prediction score for the second subset;

determining the prediction difference between the first prediction score and the second prediction score; and determining that the prediction difference satisfies the difference threshold.

13. One or more non-transitory, computer-readable media for detecting category-specific model bias storing instructions, that when executed by one or more processors, cause the one or more processors to perform operations comprising:

obtaining a first dataset to train a first machine learning model for testing a second machine learning model, wherein the first dataset comprises a plurality of features;

inputting a second dataset into the first machine learning model to obtain a first set of predictions, the first set of predictions outputted by the first machine learning model based on the first machine learning model processing the second dataset, wherein the second dataset comprises at least one feature of the plurality of features, and wherein the first machine learning model is configured to generate predictions overfitted to the first dataset;

receiving a second set of predictions, wherein the second set of predictions is outputted by the second machine learning model based on the second machine learning model processing the second dataset;

splitting, based on one or more features, entries of the second dataset into a plurality of groups, wherein each group of the plurality of groups is associated with a corresponding category;

determining that a prediction difference between a first subset of the first set of predictions and a second subset of the second set of predictions satisfies a difference threshold, wherein the first subset and the second subset both corresponds to a first group of the plurality of groups;

re-training the second machine learning model, responsive to the prediction difference satisfying the difference threshold, by adjusting a subset of parameters, of a plurality of parameters of the second machine learning model, corresponding to the first group, wherein the subset of parameters comprises a fewer number of parameters than the plurality of parameters; and in response to determining that the prediction difference satisfies the difference threshold, generating an alert related to a category corresponding to the first group.

14. The one or more non-transitory, computer-readable media of claim 13, the instructions further causing the one or more processors to perform operations comprising:

training an alternative machine learning model using data associated with the first group; and providing the alternative machine learning model for data processing.

15. The one or more non-transitory, computer-readable media of claim 14, the instructions further causing the one or more processors to perform operations comprising:

determining that the second machine learning model received input data matching the category;

in response to determining that the second machine learning model received the input data matching the category, inputting the input data matching the category into the alternative machine learning model; and obtaining an alternative prediction outputted by the alternative machine learning model.

16. The one or more non-transitory, computer-readable media of claim 13, the instructions further causing the one or more processors to perform operations comprising:

generating a plurality of data structures for the second dataset based on a parameter within the second dataset, wherein each data structure of the plurality of data structures is associated with a different range of parameter values for the parameter;

dividing the entries of the second dataset into the plurality of data structures according to a corresponding parameter value for the parameter for each entry in the second dataset; and obtaining the first group via a first data structure of the plurality of data structures, wherein a range of parameter values associated with the first data structure corresponds to the category.

17. The one or more non-transitory, computer-readable media of claim 16, wherein the instructions for generating the plurality of data structures for the second dataset further cause the one or more processors to perform operations comprising:

selecting a first parameter within the second dataset, the first parameter corresponding to a full range of first parameter values within the second dataset;

generating a decision tree for the first parameter based on the full range of the first parameter values; and inputting the second dataset into the decision tree to classify the entries of the second dataset into the plurality of data structures, wherein each data structure of the plurality of data structures corresponds to a subrange of the full range of the first parameter values.

18. The one or more non-transitory, computer-readable media of claim 17, wherein the instructions for generating the plurality of data structures further cause the one or more processors to perform operations comprising:

determining a minimum value for a minimum number of data structures for the plurality of data structures; and inputting the minimum value into the decision tree to obtain the plurality of data structures having a number of data structures equal to or greater to the minimum value.

19. The one or more non-transitory, computer-readable media of claim 13, wherein the instructions for determining that the prediction difference between the first subset and the second subset satisfies the difference threshold, further comprise:
- generating a first prediction score for the first subset and a second prediction score for the second subset;
- determining the prediction difference between the first prediction score and the second prediction score; and
- determining that the prediction difference satisfies the difference threshold.

20. The one or more non-transitory, computer-readable media of claim 13, wherein the instructions further cause the one or more processors to perform operations comprising:
- in response to the second machine learning model receiving data input matching the first group, using the subset of parameters of the second machine learning model to generate a prediction from the second machine learning model.

* * * * *